United States Patent
Kanayama

[11] Patent Number: 5,109,340
[45] Date of Patent: Apr. 28, 1992

[54] PATH PLANNING METHOD FOR MOBILE ROBOTS

[75] Inventor: Yutaka Kanayama, Goleta, Calif.

[73] Assignees: Shinko Electric Co., Ltd.; Sogo Security Services Co., Ltd., both of Tokyo, Japan

[21] Appl. No.: 540,152

[22] Filed: Jun. 19, 1990

[30] Foreign Application Priority Data

Jun. 22, 1989 [JP] Japan .................. 1-158251

[51] Int. Cl.⁵ .............................. G06F 15/50
[52] U.S. Cl. .................. 364/424.02; 364/444; 901/1
[58] Field of Search ............. 364/424.01, 424.02, 364/443, 444, 513; 518/587, 568; 180/167–169; 901/1

[56] References Cited

U.S. PATENT DOCUMENTS

| | | | |
|---|---|---|---|
| 4,679,808 | 7/1987 | Ito et al. | 280/91 |
| 4,761,595 | 8/1988 | Goor | 318/568.1 |
| 4,777,416 | 10/1988 | George, II et al. | 318/568.12 |
| 4,821,192 | 4/1989 | Taivalkoski et al. | 364/424.02 |
| 4,835,710 | 5/1989 | Schnelle et al. | 364/513 |
| 4,847,773 | 7/1989 | van Helsdingen et al. | 364/424.02 |
| 4,875,172 | 10/1989 | Kanayama | 364/424.01 |
| 4,890,233 | 12/1989 | Ando et al. | 364/457 |

Primary Examiner—Parshotam S. Lall
Assistant Examiner—Michael Zanelli
Attorney, Agent, or Firm—Flynn, Thiel, Boutell & Tanis

[57] ABSTRACT

A method of planning paths for autonomous carrier vehicles, such as a mobile robots, capable of planning curved paths consisting of cubic spirals smoother than those planned by conventional path planning methods. The path planned by the method of the invention is defined by one or two of cubic spirals with curvature expressed by a quadratic function of distance measured along the cubic spiral with zero curvatures at its opposite ends. The path is designed so that curvatures at the junctions are zero and the integral of the square of the derivative of curvature function between the opposite ends of the path is minimized. The mobile robot is able to travel very smoothly across the junctions when the integral of the square of the derivative of curvature is minimized.

4 Claims, 8 Drawing Sheets

Pplit Postures — Non-Parallel Case p2 = (1, 0, π/2)

p1 = (0, 0, 0)

q

PATH PLANNING METHOD FOR MOBILE ROBOTS

BACKGROUND OF THE INVENTION

1. Field of the Invention

The present invention relates to a method of planning paths for mobile robots, such as autonomous carrier vehicles, and, more particularly, to a method of planning curved paths for mobile robots.

2. Description of the Prior Art

Unmanned carrier vehicles are classified into those of a guide line system which runs along paths defined by magnetic tapes or guide lines and correct positional error from the paths by a guide sensor attached to the bottom of the body, and those of autonomous system called autonomous vehicles. The autonomous vehicle is provided, for example, with a command system and a location system. The command system gives the location system commands at a given time interval through communication means to specify running paths. The command system of such an autonomous vehicle divides paths into segments, divides each into a number of points, determines a reference posture at each point, and controls the autonomous vehicle by feedback control with reference to a desired speed and an angular speed produced on the basis of the coordinates of the points and reference postures of the autonomous vehicle at the points.

Conventional path planning methods for such an autonomous vehicle system define a curved segment, in most cases, by a circular arc or a combination of circular arcs. However, since the curvatures of a circular arc at any point including its opposite ends are not zero, the curvature changes discontinuously at a junction of two circular arcs or a junction of a circular arc and a straight segment, even if the two circular arcs, or the circular arc and the straight segment are joined with tangent direction continuity.

Accordingly, although no problem arises in causing a conventional autonomous vehicle to travel along straight paths, it is liable to occur that the autonomous vehicle deviates from a correct path to overshoot at a junction of two path segments, because it is impossible to make the autonomous vehicle follow instantaneous, and discontinuous variations of curvature.

SUMMARY OF THE INVENTION

Accordingly, one of the purposes of the present invention is to provide a method of planning paths for mobile robots, capable of planning curved paths smoother than those planned by conventional path planning methods and allowing the mobile robots to travel smoothly from a path segment to another.

To achieve the purpose, the present invention provides a path planning method which defines a curved path for a mobile robot by one or two cubic spirals each of which has curvature expressed by a quadratic function of length along the path with zero curvature at its opposite ends.

Thus, the path planning method in accordance with the present invention generates a path for a mobile robot by connecting cubic spirals sequentially so that the respective tangent directions of the adjacent cubic spirals at the junction are equal. The path is designed so that curvature at each junction is zero and the integral of the square of the derivative of curvature between the opposite ends of the path segment is minimized. Since the derivative of the acceleration of the mobile robot is proportional to the derivative of curvature of the path, the mobile robot is able to travel very smoothly when the integral of the square of the derivative of curvature function is minimized.

The above mentioned purposes, features and advantages of the present invention will become more apparent from the following description with the accompanying drawings.

DETAILED DESCRIPTION OF THE PREFERRED EMBODIMENT

First, generation of a path employing a single cubic spiral will be described.

Figure 1:
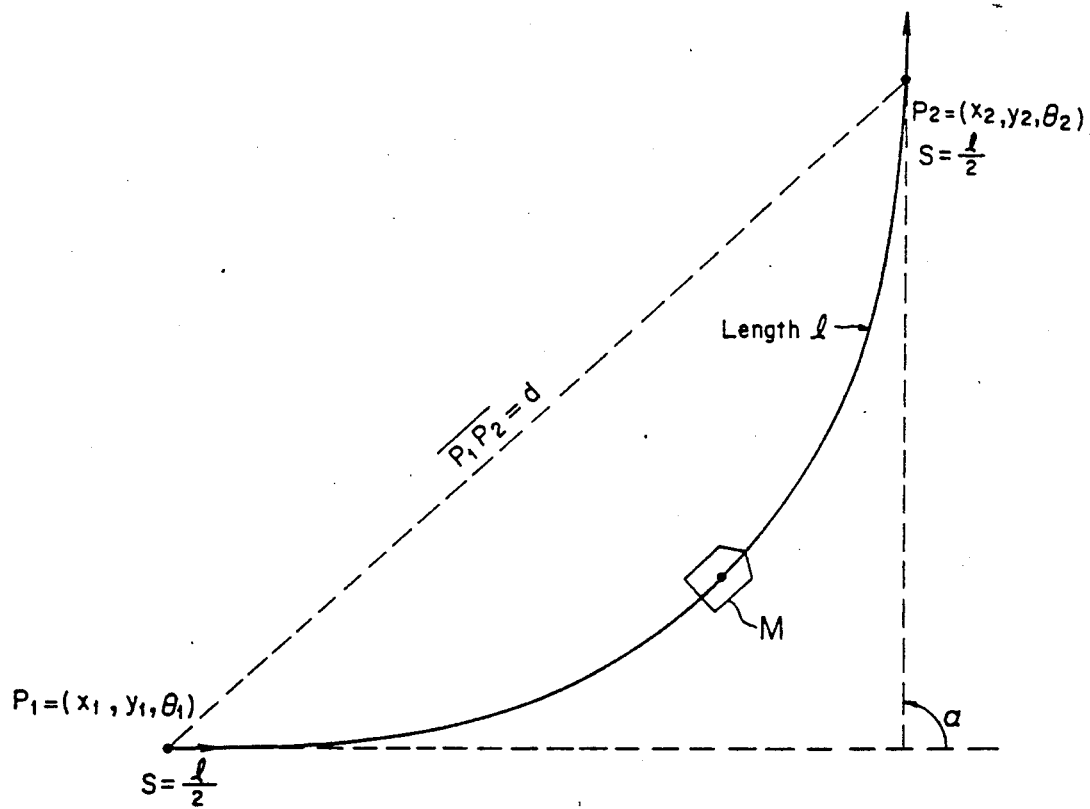
FIG. 1 is a graph of assistance in explaining a path planning principle on which the present invention is based.

Referring to FIG. 1, an autonomous mobile robot M is in a posture $P_1$ at a point represented by coordinates $(x_1, y_1)$ on a Cartesian coordinate system and in a posture $P_2$ at a point represented by coordinates $(x_2, y_2)$. The postures at those points are expressed by $P_1(x_1, y_1, \theta_1)$ and $p_2(x_2, y_2, \theta_2)$, where $\omega_1$ and $\omega_2$ indicate directions represented by angles measured counterclockwise from the X-axis. The postures $P_1$ and $P_2$ meeting the following expressions are said to be symmetric.

$$(x_1, y_1) \neq (x_2, y_2)$$

$$\tan^{-1}((y_1-y_2)/(x_1-x_2)) = (\theta_1\theta_2)/2 \tag{1}$$

The inventors of the present invention take the integral of the square of the derivative of curvature as a smoothness evaluation function: cost.

$$cost = \int_0^l (\dot{k})^2 ds = \int_0^l (\ddot{\theta})^2 ds \tag{2}$$

where l is the length of the curved path, and s is distance.

The following functions minimize Expression (2)

$$\theta(s) = As^3/6 + Bs^2/2 + Cs + D \tag{3}$$

$$\dot{\theta}(s) = As^2/2 + Bs + C = k(s) \tag{4}$$

Figure 2:
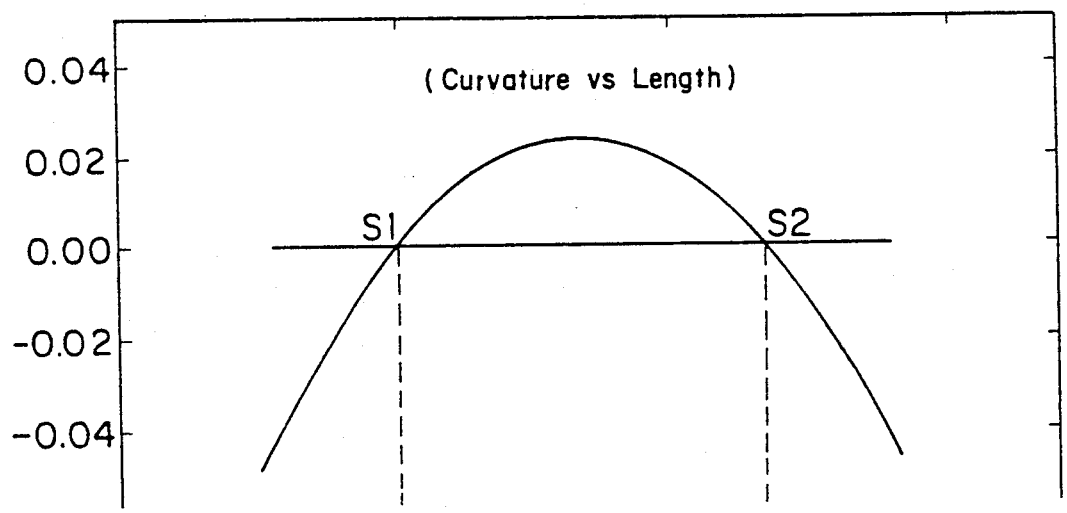
FIG. 2 is a graph showing the variation of the curvature of a cubic spiral with length.
Figure 3:
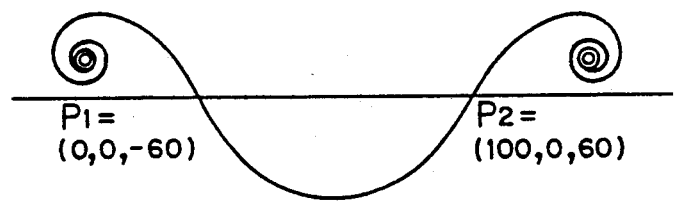
FIG. 3 is a diagram of a cubic spiral.

Shown in FIG. 2 is a curve expressed by the quadratic function k(s), and shown in FIG. 3 is the general form of a cubic function $\theta(s)$. A portion of the curve expressed by the cubic function $\theta(s)$ between points $P_1$ and $P_2$ is designated as a cubic spiral. Suppose that the length of the cubic spiral is l, and the range of distance s is expressed by $$-l/2 \leq s \leq l/2 \tag{5}$$

and the angular difference $\alpha$, namely, the change of direction from the direction in the posture $P_1$ to the direction in the posture $P_2$ is expressed by $$\alpha = \theta_2 - \theta_1 \qquad (6)$$

Then, curvature function $k(s)$ is expressed by $$\dot{\theta}(s) = k(s) = 6\alpha(l^2/4 - s^2)/l^3 \qquad (7)$$

Accordingly, the length $l$ is needed to determine the cubic spiral. The distance $D(\alpha)$ between the opposite ends of the cubic spiral of a unit length "1" is evaluated for various angular differences $\alpha$ in the range of 0° to 270° and a table containing the results of evaluation are stored beforehand in a memory.

$$D(\alpha) = \int_0^{1/2} \cos\{\alpha(2/3 - 2s^2)s\}ds \qquad (8)$$

Figure 4:
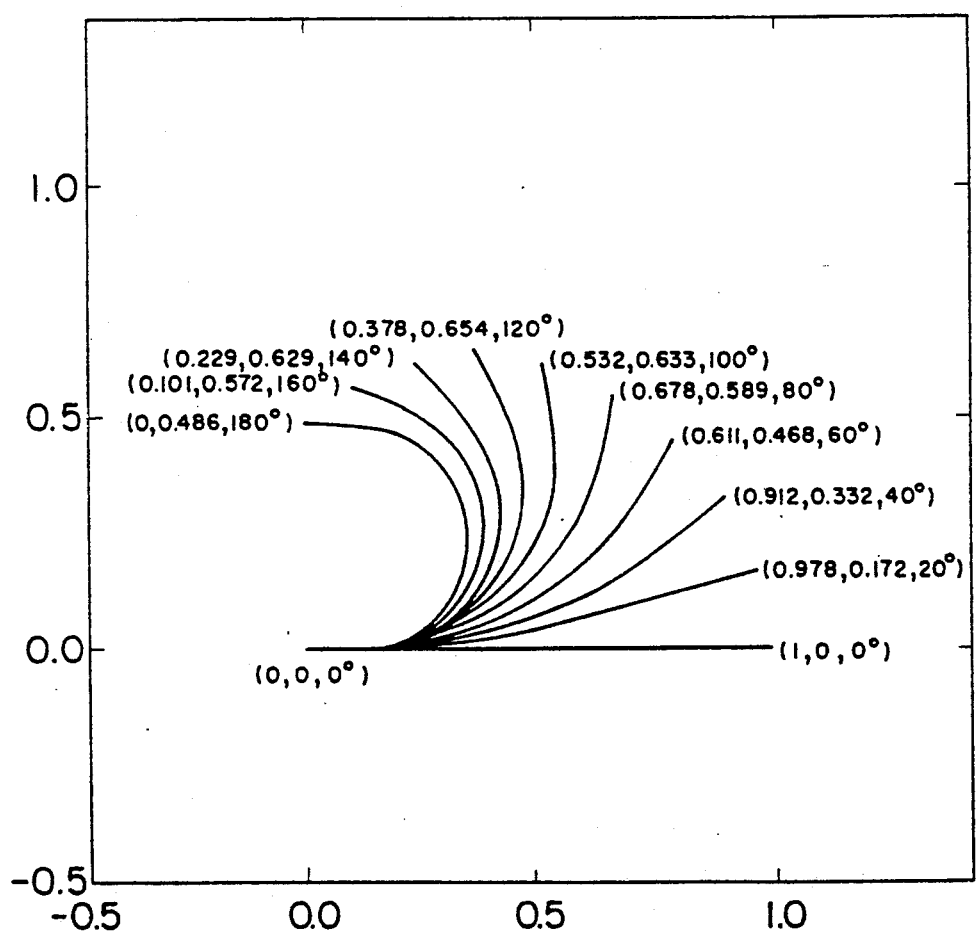
FIG. 4 is a diagram of cubic spirals.
Figure 5:
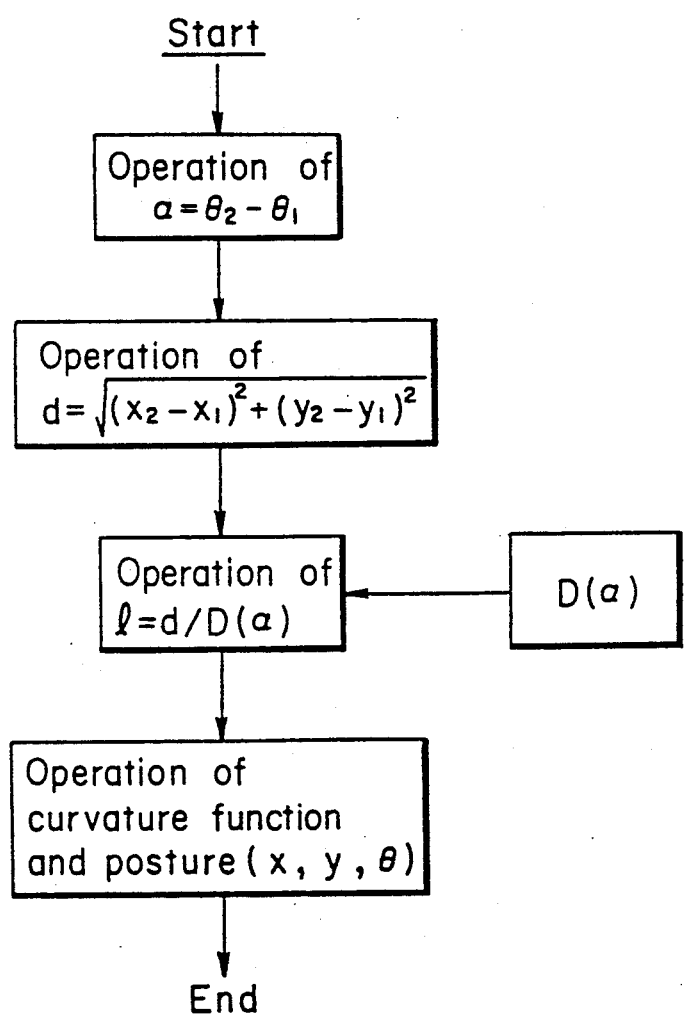
FIG. 5 is a flow chart of a path planning method embodying the present invention.

The values of $D(\alpha)$, for example, for $\alpha = 0°$, 90° and 180° are:
$D(0°) = 1.0$
$D(90°) = 0.858$
$D(180°) = 0.4861$ FIG. 4 shows cubic spirals for different angular differences $\alpha$. Then, a procedure shown in FIG. 5 is executed.

First, the angular difference $\alpha$, namely, change in the direction of travel of the mobile robot M, is calculated by using Expression (6). The scalar distance d between the postures $P_1$ and $P_2$ is obtained by using an expression:

$$d = \{(x_2 - x_1)^2 + (y_2 - y_1)^2\}^{\frac{1}{2}} \qquad (9)$$

Then, $D(\alpha)$ is retrieved from the table stored in the memory. The length $l$ of the cubic spiral, namely, the distance of travel of the mobile robot M, is obtained by $$l = d/D(\alpha)$$

The curvature function $k(s)$ is determined by using Expression (7). The tangent direction $\theta(s)$ and the points $\{x(s), y(s)\}$ are determined by using the curvature function $k(s)$ and expressions:

$$\theta(s) = \theta_1 + \int_{-l/2}^{s} k(s)ds = \theta_1 + 6\alpha/l^3 (l^2s/4 - s^3/3 + l^3/12) \qquad (11)$$

$$x(s) = x_1 + \int_{-l/2}^{s} \cos\theta(s)ds$$

$$y(s) = y_1 + \int_{-l/2}^{s} \sin\theta(s)ds \qquad (12)$$

Thus, operation for determining the curvature k is executed once for each cubic spiral, and operation using Expressions (11) and (12) is repeated periodically.

Figure 6:
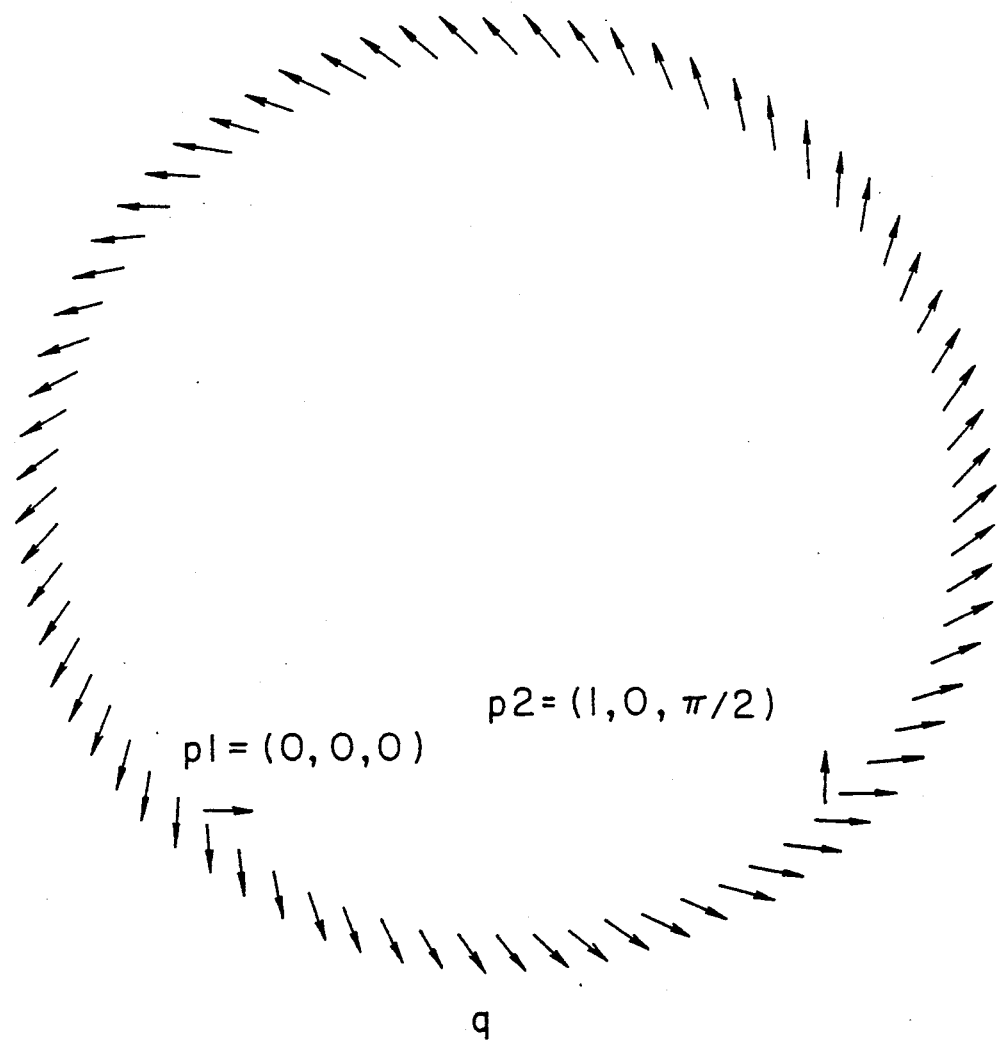
FIGS. 6 to 8 show examples of cubic spirals.

When the postures $P_1(x_1, y_1, \theta_1)$ and $P_2(x_2, y_2, \theta_2)$ are asymmetric and do not satisfy Expression (1), a path is formed of two cubic spirals. To determine the two cubic spirals, an intermediate posture $Q(x, y, \theta)$ is selected so that $P_1(x_1, y_1, \theta_1)$ and $Q(x, y, \theta)$ are symmetric, and $P_2(x_2, y_2, \theta_2)$ and $Q(x, y, \theta)$ are symmetric. An infinite number of intermediate postures Q as shown in FIG. 6 are available. A cubic spiral connecting the postures $P_1$ and Q, and a cubic spiral connecting the postures $P_2$ and Q are determined for each intermediate posture Q. The sum of the smoothness cost of both the cubic spirals are determined, and then the intermediate posture Q that minimizes the sum of the smoothness cost expressed by Expression (2) of both the cubic spirals is found to define a path consisting of the two cubic spirals connecting the postures $P_1$ and $P_2$. Then, the procedure shown in FIG. 5 is executed for the two cubic spirals.

Figure 7:
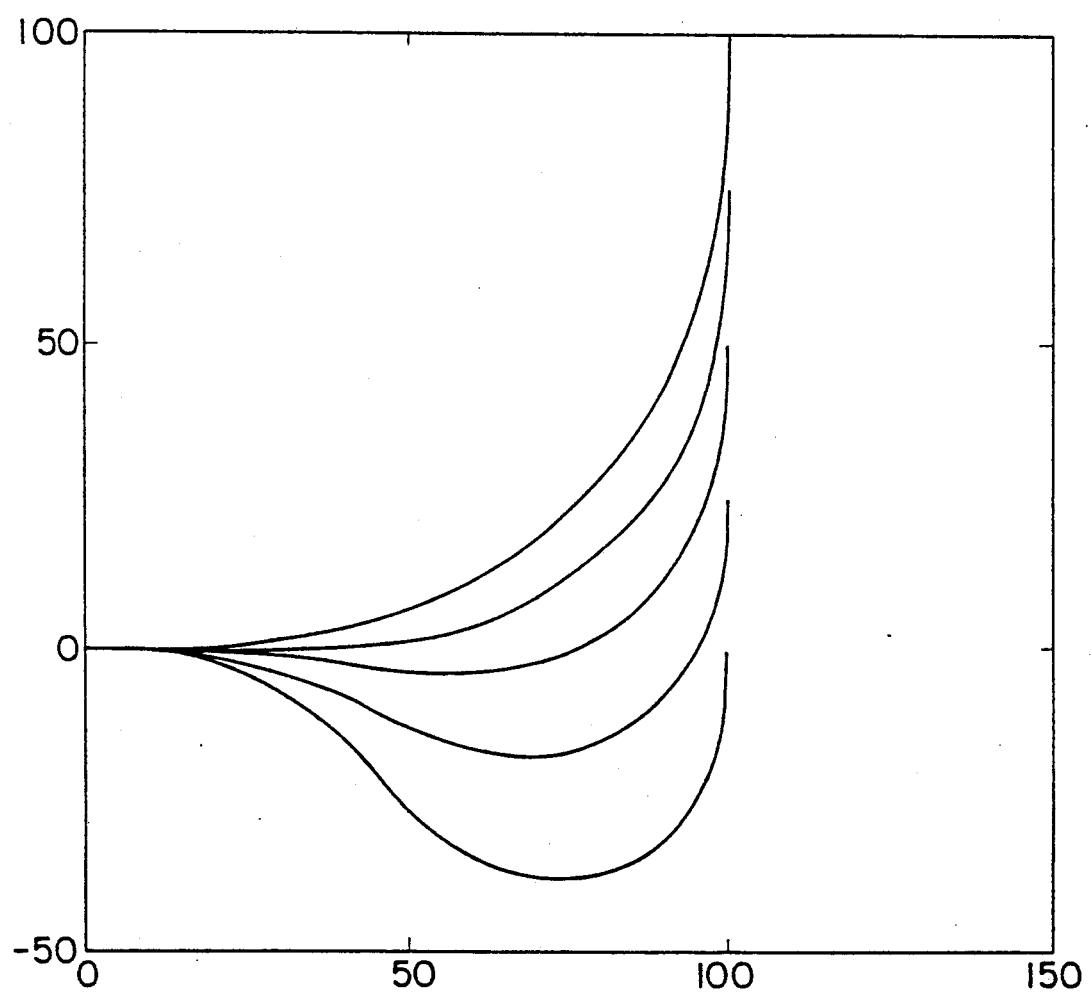
Figure 8:
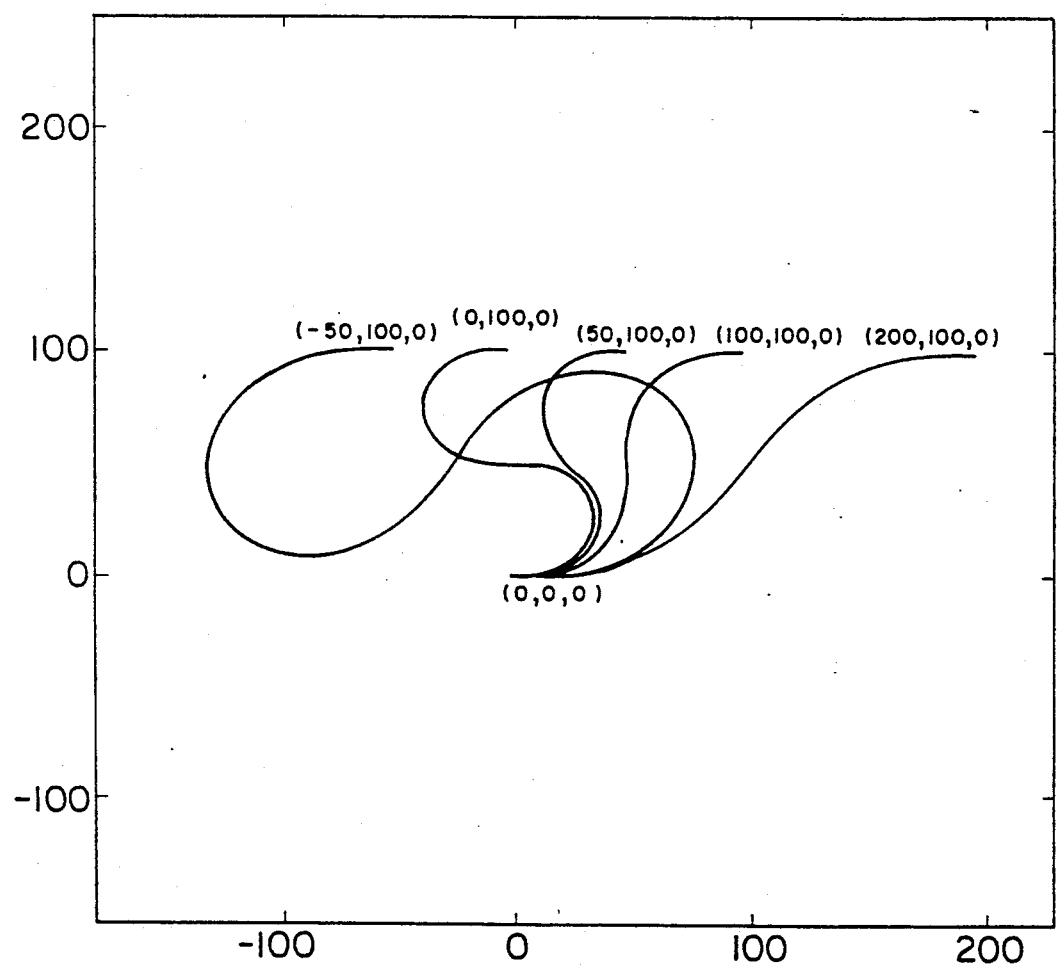
Figure 9:
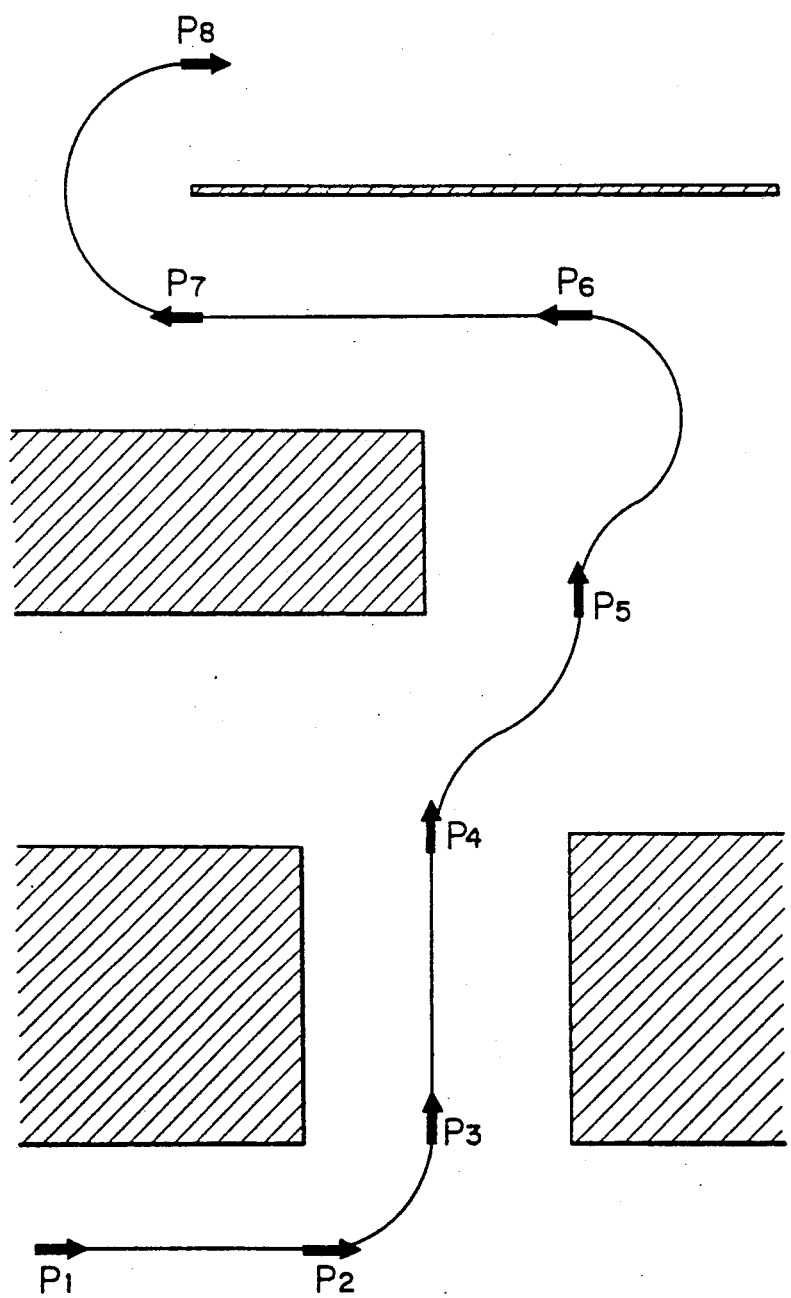
FIG. 9 is path generted by the path planning method embodying the present invention.

The lowermost path among those shown in FIG. 7 is the best solution using an intermediate posture among those in FIG. 6. Other paths shown in FIG. 7 are best solutions for different postures $P_2$. Each path shown in FIGS. 7 and 8 consists of two cubic spirals. FIG. 9 shows a global path consisting of local paths determined by the path planning method of the present invention. In the local paths shown in FIG. 9, the postures and the curvatures (zero) at the opposite ends of each local path coincide with the postures and the curvatures of the adjacent local paths, respectively.

The curvature continuity of a curved path consisting of cubic spirals designed by the path planning method of the present invention, as compared with a curved path consisting of circular arcs, enables a mobile robot to travel more smoothly and improves its positional accuracy.

Although the invention has been described as applied to planning a path for mobile robots, namely, autonomous carrier vehicles, the present invention is not limited thereto in its application, but may be applied to planning of guide lines for unmanned carrier vehicles of a guide line system.

As is apparent from the foregoing description, the continuously varying curvature of the component cubic spirals of curved paths planned by the path planning method of the present invention enables the mobile robot to travel smoothly along the curved path and, since the variation of the curvature at the junctions of the curved paths and other paths is continuous as compared with that at the junctions of paths formed of circular arcs, the overshoot of the mobile robot at the junctions of the curved paths and other paths is obviated, the mobile robot is able to travel smoothly from the curved paths to other paths, and the positional controllability of the mobile robot is improved.

Although the invention has been described in its preferred forms with a certain degree of particularity, obviously many changes and variations are possible therein. It is therefore to be understood that the present invention may be practiced otherwise than as specifically described herein without departing from the scope and spirit thereof.

What is claimed is:

1. A method of planning a path for a mobile robot to travel from a first posture to a second posture, comprising the steps of:
   specifying the path in the form of at least one cubic spiral which has curvature expressed by a quadratic function of distance measured along the curve, and has zero curvature at each end thereof; and
   controlling movement of the mobile robot along the path as defined by said cubic spiral.

2. A method of planning a path for a mobile robot to travel from a first posture to a second posture according to claim 1, wherein the path is specified using two cubic spirals, wherein an intermediate posture symmetric with both the first and second postures is determined, and wherein the path is specified by a first cubic spiral connecting the first posture and the intermediate posture, and a second cubic spiral connecting the second posture and the intermediate posture.

3. A method of planning a path for a mobile robot to travel from a first posture to a second posture according to claim 2, wherein the path is specified through steps of:

calculating the angular difference $\alpha$ between the first and intermediate postures;

calculating the scalar distance d between the positional coordinates of the first and intermediate postures;

determining the distance of travel of the mobile robot, including the step of calculating a length l of said first cubic spiral on the basis of said scalar distance and the distance between opposite ends of a reference cubic spiral having a unit length and having curvatures of zero at the opposite ends thereof, and said last-mentioned calculating step including the step of using said angular difference to determine said distance between said ends of said reference cubic spiral;

calculating curvature k by using a formula:

$$k = 6\alpha(l^2/4 - s^2)/l^2 \ (-l/2 \leq s \leq l/2); \text{ and}$$

periodically calculating the posture of the mobile robot on the basis of the calculated curvature k.

4. A method of planning a path for a mobile robot to travel from a first posture to a second posture according to claim 1, wherein the path is specified through steps of:

calculating the angular difference $\alpha$ between the first and second postures;

calculating the scalar distance d between the positional coordinates of the first and second postures;

determining the distance of travel of the mobile robot, including the step of calculating a length l of said cubic spiral on the basis of said scalar distance and the distance between opposite ends of a reference cubic spiral having a unit length and having curvatures of zero at the opposite ends thereof, and said last-mentioned calculating step including the step of using said angular difference to determine said distance between said ends of said reference cubic spiral;

calculating curvature k by using a formula:

$$k = 6\alpha(l^2/4 - s^2)/l^2 \ (-l/2 \leq s \leq l/2); \text{ and}$$

periodically calculating the posture of the mobile robot on the basis of the calculated curvature k.

\* \* \* \* \*

UNITED STATES PATENT AND TRADEMARK OFFICE
CERTIFICATE OF CORRECTION

PATENT NO. : 5 109 340
DATED : April 28, 1992
INVENTOR(S) : Yutaka Kanayama

It is certified that error appears in the above-identified patent and that said Letters Patent is hereby corrected as shown below:

Column 5, line 28; change the formula to:
$$---k=6\alpha(\ell^2/4-s^2)/\ell^3 \quad (-\ell/2 \leqq s \leqq \ell/2)---.$$

Column 6, line 24; change the formula to:
$$---k=6\alpha(\ell^2/4-s^2)/\ell^3 \quad (-\ell/2 \leqq s \leqq \ell/2)---.$$

Signed and Sealed this

Twenty-first Day of September, 1993

Attest:

BRUCE LEHMAN

*Attesting Officer*     *Commissioner of Patents and Trademarks*